United States Patent [19]

Shiroyanagi et al.

[11] Patent Number: 4,819,203
[45] Date of Patent: Apr. 4, 1989

[54] CONTROL SYSTEM FOR INTERRUPTION LONG DATA TRANSFERS BETWEEN A DISK UNIT OR DISK COCHE AND MAIN MEMORY TO EXECUTE INPUT/OUTPUT INSTRUCTIONS

[75] Inventors: Yoshiro Shiroyanagi; Akira Kurano, both of Odawara, Japan

[73] Assignee: Hitachi, Ltd., Tokyo, Japan

[21] Appl. No.: 38,704

[22] Filed: Apr. 15, 1987

[30] Foreign Application Priority Data

Apr. 16, 1986 [JP] Japan ................. 61-85909

[51] Int. Cl.⁴ .................. G06F 9/00; G06F 13/00; G06F 13/26
[52] U.S. Cl. .................................... 364/900
[58] Field of Search ... 364/200 MS File, 900 MS File

[56] References Cited

U.S. PATENT DOCUMENTS

| 4,394,732 | 7/1983 | Swenson | 364/200 |
| 4,433,374 | 2/1984 | Hanson et al. | 364/200 |
| 4,490,782 | 12/1984 | Dixon et al. | 364/200 |
| 4,523,206 | 6/1985 | Sasscer | 364/200 |
| 4,533,995 | 8/1985 | Christian et al. | 364/200 |
| 4,593,354 | 6/1986 | Ushiro | 364/200 |

Primary Examiner—Archie E. Williams, Jr.
Assistant Examiner—Ayni Mohamed
Attorney, Agent, or Firm—Antonelli, Terry & Wands

[57] ABSTRACT

A control system for a disk cache memory is disposed between a main memory unit and a disk unit for storing a record of data from the disk unit. The control system is designed such that when an input/output instruction is issued from a CPU while data loading is being performed from the disk unit to the cache memory, it interrupts the data loading once so that an input/output instruction from the CPU can be executed, thereby considerably reducing the time of wait for execution of the input/output instruction.

7 Claims, 3 Drawing Sheets

CONTROL SYSTEM FOR INTERRUPTION LONG DATA TRANSFERS BETWEEN A DISK UNIT OR DISK COCHE AND MAIN MEMORY TO EXECUTE INPUT/OUTPUT INSTRUCTIONS

BACKGROUND OF THE INVENTION (a) Field of the Invention:

The present invention relates to a control system for a disk cache memory used between a main memory and a disk unit.

(b) Related Art Statement:

For improvement of the effective processing speed of a disk unit, a disk cache memory system has been proposed in which a cache memory is used between the main memory unit and the disk unit. With an input/output instruction from the central processing unit, the disk cache system will access the cache memory if object data is found in the latter. If not, simultaneously with, before or after the input/output process, the data near the object data are loaded in a certain amount from the disk unit into the cache memory to meet the data request of an input/output instruction which will be issued later. This data loading is done per record, track, several tracks, cylinder, data set or the like. Generally, however, in case a variable-length record is handled, the data loading is done per track or several tracks in many cases. Since it is evident that particularly in a process of reading a sequence of data sets in which access to a record is sequentially done, data is read sequentially from one record after another, it is effective to read data from several tracks and load them into the cache memory. A technique related to such a system is known from the Japanese Unexamined Patent Publication No. 55-157056.

In case the data handled with one input/output instruction is long, it can be effectively loaded using a long unit but not the sequential access.

However, no consideration was given to the fact that loading such long data all at once into the cache memory will take a longer time. Namely, in this conventional technique, an input/output instruction is issued during a long time of data loading, and if it is found in the cache memory (this is called "miss" and existence of such instruction in the cache memory is called "hit"), access to the disk memory is put off until the data loading has been completed, which results in an increased input/output processing time. This wait time is dozens of milliseconds even for the data loading from one track. Loading from several tracks or cylinders will take several times or dozens of times as long time as the wait time for data loading from one track. Therefore, in case the probability of "hit" is low, data loading will increase causing a very large overhead.

SUMMARY OF THE INVENTION

The present invention seeks to overcome the above-mentioned drawbacks of the conventional techniques by providing a control system for a disk cache memory which can, when an input/output instruction is issued from a CPU (central processing unit) while data is being loaded from a disk unit into the cache memory, considerably reduce the time of wait for execution of the input/output instruction.

According to another aspect of the present invention, a control system for a disk cache memory is provided which can, when an input/output instruction is issued from CPU while data is being loaded from a disk unit into the cache memory, interrupt this data loading once and give priority to the execution of the input/output instruction from the CPU.

According to a yet another aspect of the present invention, a control system for a disk cache memory is provided which can, when the execution of an input/output instruction from a CPU has been completed, resume the data loading having once been interrupted. Thus, the data loading having once been interrupted can be efficiently done taking no account of the time for execution of the input/output instruction.

The above objects of the present invention can be accomplished by providing a control system for a disk cache memory including a disk cache controller so designed as to judge, in response to an input/output instruction from a CPU, whether an object data is found in the cache memory or not, and to transfer, according to the result of the judgement, the object data from the cache memory or a disk unit to a main memory unit, the disk cache controller comprising, according to the present invention, an upper interface control which receives and processes the input/output instruction from CPU, a lower interface control to load data from the disk unit into the cache memory, a first means of recognizing that the lower interface control is effecting the data loading, and a second means of accessing the first means and giving, when the latter recognizes that the lower interface control is effecting the data loading, a command for interrupting the data loading, whereby when the input/output instruction is issued from CPU while the data is being loaded from the disk unit into the cache memory, the data loading is once interrupted so that the input/output instruction from CPU can be executed, thereby permitting a considerable reduction of the time of wait for execution of the input/output instruction from CPU.

These and other objects and advantages of the present invention will be better understood from the ensuing description made by way of example of the embodiment of the control system for disk cache memory according to the present invention with reference to the drawings.

DETAILED DESCRIPTION OF THE PREFERRED EMBODIMENTS

Figure 1:
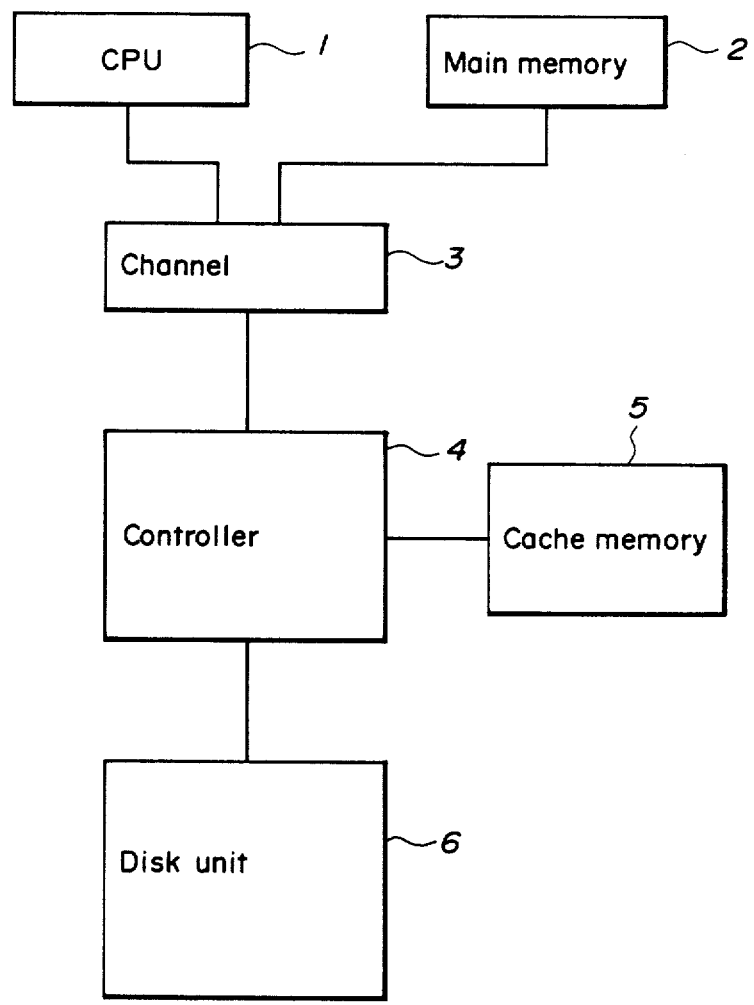
FIG. 1 is a schematic diagram of a computer system to which the control system for disk cache memory according to the present invention.

FIG. 1 is a schematic diagram which shows generally a computer system to which the control system according to the present invention is applied. When an input/output instruction is issued from CPU 1 to a channel 3, the channel 3 fetches a group of commands from a main memory unit 2 and issues a command to a disk cache controller 4 which will decode the command. If a requested data is found in a cache memory 5, an object data is transferred between the cache memory 5 and main memory unit 2. If not, the object data is transferred between a disk unit 6 and main memory unit 2. As seen from FIG. 2, the disk cache controller 4 has an upper interface control 41 which receives and processes an input/output instruction from CPU 1. The command according to the input/output instruction is decoded according to a micro-program stored in a microprocessor (not shown) in the upper interface control 41 and which controls the control 41. Also it can be judged under the above-mentioned micro-program whether the requested data is found in the cache memory 5 or not.

Further, the disk cache controller 4 is provided with a lower interface control 42 having a microprocessor (not shown) to control the data transfer (data loading) from the disk unit 6 to the cache memory 5. In this embodiment, the upper and lower interface controls 41 and 42 each have an independent microprocessor and microprogram, respectively. However, it is also possible to provide a common processor in the controller 4 in order to share a program for separately controlling the upper and lower interface controls 41 and 42.

The reference numeral 43 indicates a first flip-flop disposed between the upper and lower interface controls 41 and 42 and which serves to recognize whether a record is being transferred (loaded) from the disk unit 6 into the cache memory 5. Assume here that the data loading is taken as "1" while the loading of no data is taken as "0".

The reference numeral 44 indicates a second flip-flop disposed between the upper and lower interface controls 41 and 42 and which issues, when the first flip-flop 43 is in the "1" state, namely, when the flip-flop 43 is on, a command for interruption of the data loading to the lower interface control 42 which will, after receiving the data-loading interrupting command through the second flip-flop 44, load a final code of one track in the disk unit 5 at an appropriate time and then stop the data loading. After the data loading is interrupted, the lower interface control 42 will cause the first flip-flop 43 to take the "0" state, namely, reset this flip-flop. When the upper interface control 41 recognizes that the first flip-flop 43 is reset, the input/output instruction from CPU having been in the wait state is executed.

Further, the control system for disk cache memory according to the present invention has disposed between the upper and lower interface controls 41 and 42 a means 45 which will, when the execution of the input/output instruction from CPU 1 is completed, give the lower interface control 42 information as to whether the data loading is to be resumed or not. This means 45 is implemented by, for example, a memory (RAM). The memory 45 has, for each disk drive of the disk unit 6, an address at which positional information on a cylinder head and track at which the data loading is to be resumed are stored.

Also there is provided for each address in the memory 45 a flag which will be set "1" or "0" according to whether the command for resuming the data loading from the upper interface control 41 is valid or invalid. In case the data loading is resumed with respect to a disk drive indicated with a number, for example, "2", the upper interface control 41 will set "1" in the flag corresponding to that disk drive. The lower interface control 42 searches for a valid flag, namely, a flag in the "1" state, in the memory 45 and when it thus recognizes that the disk drive indicated with a number "2" is valid, the data loading is resumed from a certain track in the disk drive.

Each time the data loading is interrupted, the lower interface control 42 has acquired information on the positions of the cylinder head and track for which the data loading has been designated but not yet done, based on the information concerning the positions of the cylinder head and track for which the data loading has initially been designated and the positions of the cylinder head and track for which the data loading has been completed by the discontinuance of the data loading, and at each time, the information is written at a predetermined address in the memory 45.

In the control system for disk cache memory according to the present invention, the addition of such data-loading resuming function permits system to efficiently resume the data loading during any time other than the execution of the input/output instruction from CPU, thereby improving the throughput.

Also, the aforementioned first and second flip-flops 43 and 44 and the means 45 giving the information to resume the data loading may be each composed of a memory disposed between the upper and lower interface controls 41 and 42 and which is accessible from these controls. Also, in case the upper and lower interface controls 41 and 42 work according to a same program, the first and second flip-flops 43 and 44 and the means 45 may be formed each by a memory which can access in common the programs of the controls 41 and 42.

Figure 2:
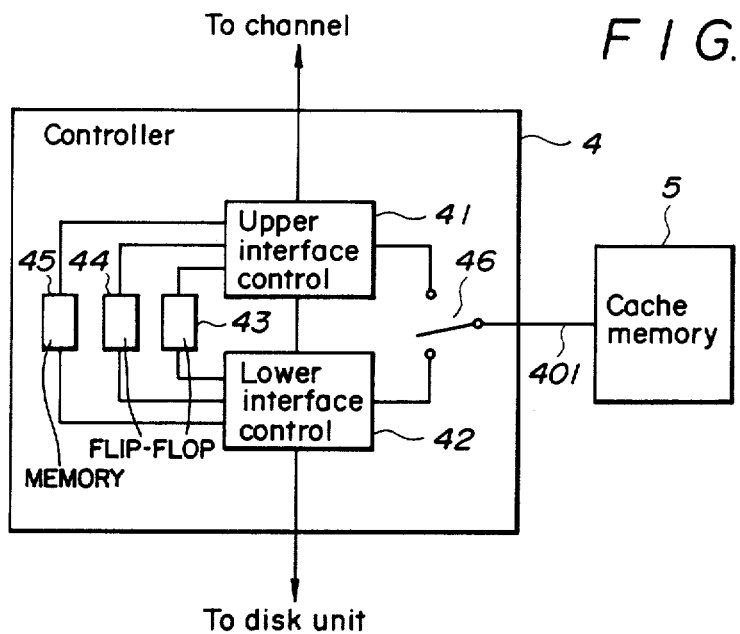
FIG. 2 is an internal schematic diagram showing one embodiment of the control system for disk cache memory according to the present invention.
Figure 3:
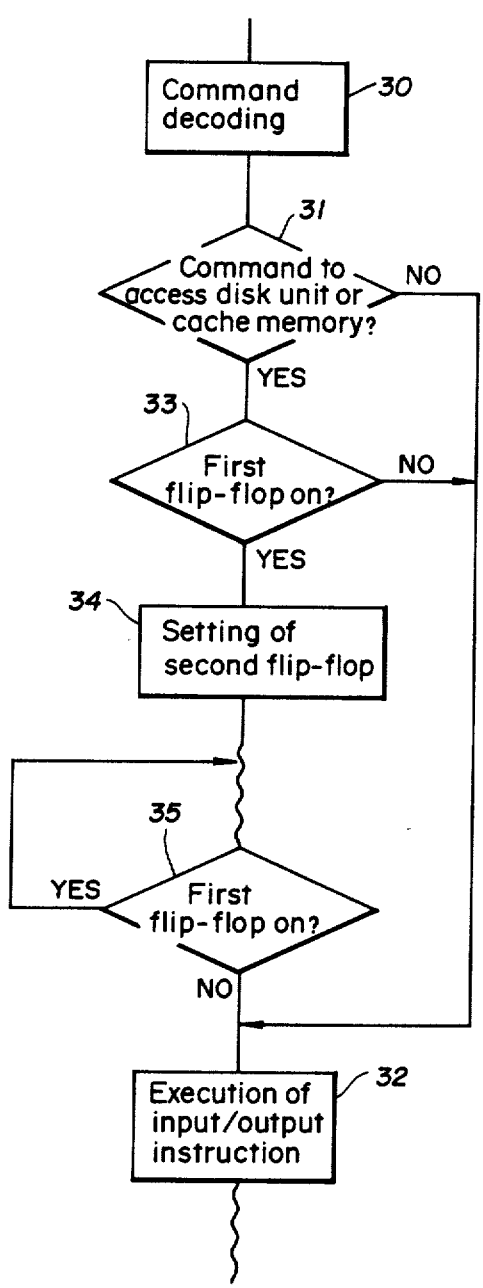
FIG. 3 is a functional flow chart of the control system.

In the embodiment shown in FIG. 2, a record is transferred from the disk unit 6 to the cache memory 5 via the lower interface control 42, a bus changeover switch 46 and cache bus 401. The cache bus 401 is so arranged as to be commonly usable for writing to the cache memory 5 (data loading and write) and reading from the cache memory 5 (read at the "hit" time). When an input/output instruction is issued from CPU 1 while data loading is being done, the channel 3 issues a start command to the controller 4. An example flow chart of operations within the controller 4 is shown in FIG. 3. The upper interface control 41 receives the start command and decodes the command (step 30). The command is examined whether or not the input/output instruction is one which requires access to the disk unit 6 or cache memory 5 for the purpose of read or write (step 31). If such access is not required, the instruction is executed within the controller 4 (step 32). If the access to the disk unit or cache memory is necessary, it is examined whether the first flip-flop 43 is in the "0" or "1" state (step 33). When it recognizes that the first flip-flop 43 is in the "0" state, namely, the lower interface control 42 is not in a data-loading operation, the upper interface control 41 transfers data to and from the disk unit 6 via the lower interface control 42 or the cache memory 5 via the cache bus 401 according to the "miss" or "hit" state, respectively. If it recognizes that the first flip-flop 43 is in the "1" state, namely, the lower interface control 42 is in a data-loading operation, and the upper interface control 41 sets the second flip-flop 44 in the "1" state to give a data-loading interrupting command to the lower interface control 42 (step 34). The lower interface control 42 checks whether the second flip-flop 44 is set or not. If it recognizes that the second flip-flop 44 is set, the lower interface control 42 makes a preparation for stopping the data loading operation. If it recognizes that the second flip-flop 44 is set during the data loading operation having been started under the assumption that pre-loading and loading of the sequential file is done for several tracks, the lower interface control 42 stops the data loading operation when the final record recorded in the track during the concurrent data loading has been loaded into the cache memory 5. In this case, the track having already been loaded is handled as valid data within the cache memory 5. After interrupting the data loading, the lower interface control 42 will reset the first flip-flop 43. When it recognizes that the first flip-flop 43 is thus reset, the upper interface control 41 executes the input/output instruction having been in the wait state (step 35). When the execution of the input/output instruction is completed (step 32), the upper interface control 41 will set in the "1" state a flag for the address within the memory 45 corresponding to the positions of cylinder head and track for which the data loading operation is to be resumed, thereby indicating that the data loading can be resumed and specifying to the disk unit 6 the positions of the cylinder head and track of which the flag is "1" to resume the data loading to the cache memory 5.

Figure 4:
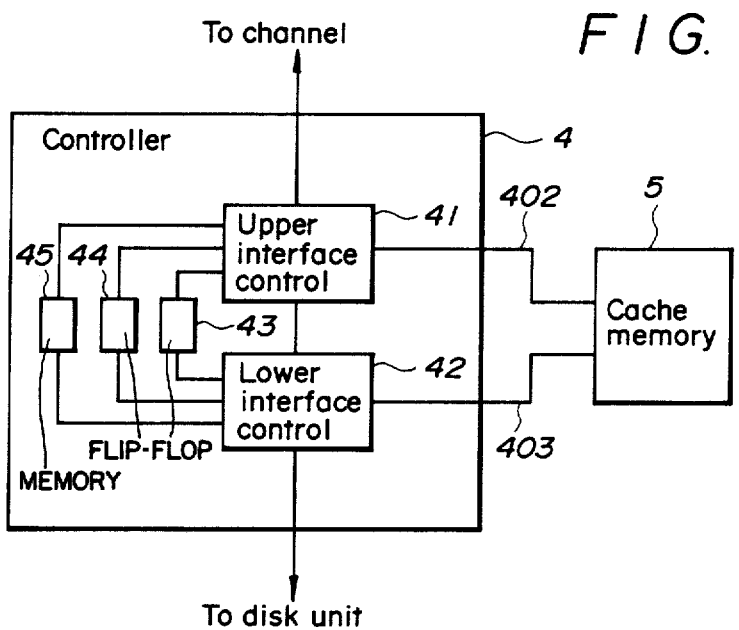
FIG. 4 is an internal schematic diagram showing another embodiment of the control system for disk cache memory in which a cache data read bus and cache data write bus are provided separately.

FIG. 4 shows another embodiment of the control system for disk cache memory according to the present invention, in which a cache data read bus 402 is disposed between the upper interface control 41 and cache memory 5 and also a cache data write bus 403 is disposed between the lower interface control 42 and cache memory 5, for exclusive use to read and write the data from and to the cache, respectively. This second embodiment operates in a similar manner to the first embodiment shown in FIG. 2, except that at the "read hit" time, even while the lower interface control 42 is in the data-loading operation, the upper interface control 41 can read cache data from the cache memory 5 and transfer it to the channel 3 via the cache data read bus 402, without discontinuance of the data loading operation. Therefore, in this case, the data-loading operation shoud be discontinued only when access to the disk unit 6 is necessary ("read miss", write operation or the like).

One example of the basic data flow at the time of data transfer in the control system according to the present invention will be described herebelow.

First, when a record reading of which is requested is not found in the cache memory 5, namely, at time of "read miss", the object record is transferred from the disk unit 6 to both the channel 3 and cache memory 5. Thereafter, when a command which loses the orientation of the disk unit 6 (command which handles no record) is chained or a command chain is completed, up to a record preceding a one of which the loading is started immediately after the command chaining or completion of the command chain are loaded into the cache memory 5.

If the record the read from which is requested is found in the cache, namely, at time of "read hit", the object record is transferred from the cache memory 5 to the channel 3.

When a record the write to which is requested is not found in the cache memory 5, namely, at time of "write miss", data to be written is transferred from the channel 3 to the disk unit 6. The data is written only into the disk unit 6, not into the cache memory 5.

If the record the write to which is found in the cache memory 5 ("write hit"), data to be written is transferred from the channel 3 to both the disk unit 6 and cache memory 5.

As having been described in the foregoing, in the control system for disk cache memory according to the present invention, since it is possible to interrupt, even if an input/output instruction is issued during data loading, the data loading at an appropriate time, the time of wait for execution of the input/output instruction can be reduced.

In the embodiments, the cache memory 5 is connected to the controller 4; however, it is evident to those skilled in the art that the cache memory 5 may be located any where between the main memory unit 2 and disk unit 6.

What is claimed is:

1. A control system for a disk cache memory disposed between a main memory unit and a disk unit, including a disk cache controller comprising:

an upper interface control for receiving an input/output instruction from a central processing unit (CPU), for judging, in response to said input/output instruction, whether object data is found in said disk cache memory, and for controlling data transfer, based on a result of the judgement, of said object data from said disk cache memory if said object data is found in said disk cache memory, or from said disk unit if said object data is not found in said disk cache memory to said main memory unit; and a lower interface control for controlling data transfer from said disk unit to said disk cache memory;

wherein said upper interface control includes first means for accessing said lower interface control and recognizing whether said lower interface control has performed a data transfer from said disk unit to said disk cache memory, and second means for accessing said first means and providing, when the recognition performed by said first means is positive, a command to said lower interface control interrupting the data transfer being performed thereby;

wherein the data transfer performed by said upper interface control upon reception of said input/output instruction from said CPU is executed after said lower interface control receives a command from said second means interrupting the data transfer from said disk unit to said disk cache memory being performed by the lower interface control.

2. A control system according to claim 1 wherein said disk cache controller further comprises:

a third means for providing, upon completion of the data transfer performed by said upper interface control a command to said lower interface control which includes information on resumption of the data transfer being performed by said lower interface control.

3. A control system according to claim 2, wherein said third means comprises a memory means in which said information on resumption of the data transfer being performed by said lower interface control is stored.

4. A control system according to claim 3, wherein said information on resumption of the data transfer being performed by said lower interface control is provided from said lower interface control to said memory means during the data transfer being performed by said lower interface control, and said upper interface control sets said memory means so as to provide, upon completion of the data transfer performed by said upper interface control, predetermined information to said lower interface control on resumption of data transfer being performed thereby through said memory means, and said lower interface control resumes the data transfer being performed thereby in response to said information on resumption of the data transfer being performed by said lower interface control.

5. A control system according to claim 1, wherein said first and second means each comprises a flip-flop, wherein a first flip-flop of said first means is set to a binary "1" by said lower interface control during a data transfer operation performed thereby, and a second flip-flop of said second means is set to a binary "1" by said upper interface control upon recognition of the binary "1" of said first flip-flop causing said second flip-flop to provide a command to said lower interface control interrupting the data transfer being performed thereby.

6. A control system according to claim 5, wherein said first flip-flop is set to a binary "0" by said lower interface control upon interruption of the data transfer being performed by said lower interface control, and said upper interface control performs a data transfer after recognizing that said first flip-flop is set to a binary "0".

7. A control system according to claim 1, wherein said upper and lower interface controls are connected to said disk cache memory by means of respective dedicated buses.

* * * * *